US010759688B2

(12) United States Patent
MacPhee et al.

(10) Patent No.: US 10,759,688 B2
(45) Date of Patent: Sep. 1, 2020

(54) GLASS MELTER WITH OXYGEN/GAS HEAT-UP BURNER SYSTEM

(71) Applicant: OCV Intellectual Capital, LLC, Toledo, OH (US)

(72) Inventors: James Alan MacPhee, Newark, OH (US); Steven James Mighton, Granville, OH (US); Daniel A. Ertl, Noblesville, IN (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 275 days.

(21) Appl. No.: 15/572,194

(22) PCT Filed: Jun. 24, 2016

(86) PCT No.: PCT/US2016/039184
§ 371 (c)(1),
(2) Date: Nov. 7, 2017

(87) PCT Pub. No.: WO2016/210233
PCT Pub. Date: Dec. 29, 2016

(65) Prior Publication Data
US 2018/0111866 A1    Apr. 26, 2018

Related U.S. Application Data

(60) Provisional application No. 62/185,026, filed on Jun. 26, 2015.

(51) Int. Cl.
C03B 5/23      (2006.01)
C03B 5/235     (2006.01)
C03B 5/44      (2006.01)

(52) U.S. Cl.
CPC .......... *C03B 5/2353* (2013.01); *C03B 5/2356* (2013.01); *C03B 5/44* (2013.01);
(Continued)

(58) Field of Classification Search
CPC .... C03B 3/00; C03B 3/02; C03B 5/00; C03B 5/16; C03B 5/202; C03B 5/2356
See application file for complete search history.

(56) References Cited

U.S. PATENT DOCUMENTS 3,170,781 A     2/1965  Keefer
4,290,797 A *   9/1981  Rossi ..................... C03B 3/00
                                              65/27
(Continued)

FOREIGN PATENT DOCUMENTS

EP         2397446        12/2011

OTHER PUBLICATIONS

Communication pursuant to Article 94(3) EPC from EP Application No. 16736340.7 dated Oct. 26, 2018.
(Continued)

Primary Examiner — Gregory A Wilson
(74) Attorney, Agent, or Firm — Calfee, Halter & Griswold LLP

(57) ABSTRACT

A submerged combustion melting system (90) includes a submerged combustion melter (100) having a housing with one or more side walls (104), a floor (106), and a ceiling (108) which at least partially define a melt chamber (110). The melter has one or more main burners (128) positioned along the floor of the housing and an oxygen/gas burner in a preheat burner system (300) removably attached to one of the sidewalls or the ceiling, the oxygen/gas burner arranged such that a flame from the oxygen/gas burner is directed downward into the melt chamber.

20 Claims, 3 Drawing Sheets

(52) U.S. Cl.
CPC ....... *C03B 2211/23* (2013.01); *C03B 2211/40* (2013.01); *Y02P 40/55* (2015.11)

(56) References Cited

U.S. PATENT DOCUMENTS

| | | | | |
|---|---|---|---|---|
| 4,773,847 | A * | 9/1988 | Shukla | F23D 11/36 |
| | | | | 136/208 |
| 4,892,475 | A | 1/1990 | Farrenkopf et al. | |
| 5,066,326 | A * | 11/1991 | Agarwal | C21C 5/562 |
| | | | | 75/581 |
| 5,743,723 | A * | 4/1998 | Iatrides | F23D 1/00 |
| | | | | 431/12 |
| 6,237,369 | B1 | 5/2001 | LeBlanc et al. | |
| 6,422,041 | B1 * | 7/2002 | Simpson | C03B 5/193 |
| | | | | 65/134.4 |
| 7,475,569 | B2 | 1/2009 | Baker et al. | |
| 9,096,452 | B2 * | 8/2015 | Charbonneau | C03B 3/00 |
| 9,533,905 | B2 * | 1/2017 | Charbonneau | C03B 5/04 |
| 9,573,831 | B2 * | 2/2017 | Charbonneau | C03B 5/2356 |
| 10,183,884 | B2 * | 1/2019 | Baker | F23D 14/78 |
| 10,337,732 | B2 * | 7/2019 | Faulkinbury | C03B 5/2356 |
| 2015/0232363 | A1 * | 8/2015 | Solvang | C03B 5/12 |
| | | | | 65/470 |
| 2017/0015579 | A1 * | 1/2017 | Charbonneau | F23D 14/22 |

OTHER PUBLICATIONS

Mark A. Niemkiewicz et al., "Chapter 6: Safety Overview" from Oxygen-Enhanced Combustion, CRC Press, pp. 109-119, ISBN: 9781439862308, published Mar. 15, 2013.
Mark A. Niemkiewicz et al., "Chapter 17: Equipment Design" from Oxygen-Enhanced Combustion, CRC Press, pp. 423-444, ISBN: 9781439862308, published Mar. 15, 2013.
Hisashi (Sho) Kobayashi et al., "Chapter 18: Burner Design" from Oxygen-Enhanced Combustion, CRC Press, pp. 445-470, ISBN: 9781439862308, published Mar. 15, 2013.
Office Action from Brazilian Application No. BR112017028030-2 dated Jan. 27, 2020.
International Search Report and Written Opinion from PCT/US16/39184 dated Oct. 11, 2016.
Office Action from Chinese Application No. 201680036040.9 dated Feb. 19, 2020.
Office Action from European Application No. 16736340.7 dated Feb. 24, 2020.

* cited by examiner

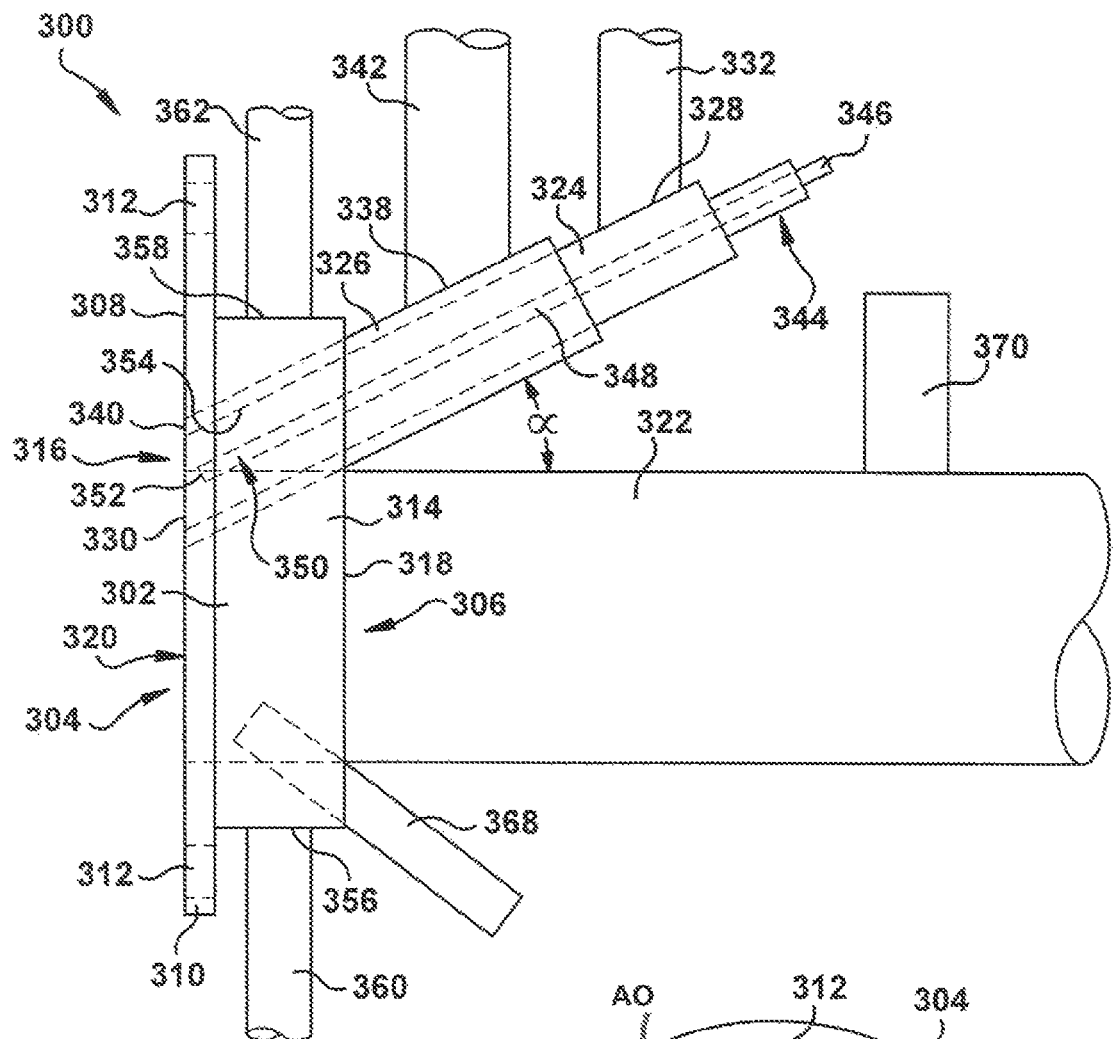
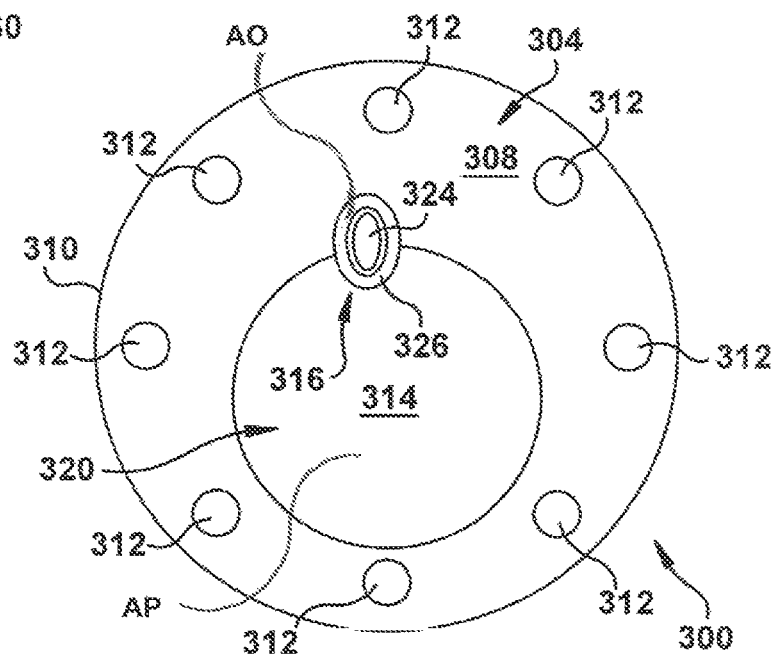
Fig. 3
Fig. 4

GLASS MELTER WITH OXYGEN/GAS HEAT-UP BURNER SYSTEM

RELATED APPLICATIONS

This application is the U.S. national stage entry of PCT/US2016/039184, filed Jun. 24, 2016, which claims priority to and all benefit of U.S. Provisional Patent Application Ser. No. 62/185,026, filed on Jun. 26, 2015, for GLASS MELTER WITH OXYGEN/GAS HEAT-UP BURNER SYSTEM, the entire disclosures of which are fully incorporated herein by reference.

FIELD

The general inventive concepts relate generally to glass melter systems for producing molten glass and, more particularly, to glass melter systems with an oxygen/gas heat-up burner system.

BACKGROUND

In the manufacture of continuous glass filaments, batch is loaded into a melter to create a glass composition. The batch is melted in a furnace and the glass flows through a refining process to one or more bushings in a filament forming apparatus. Typically, each bushing includes many nozzles or tips through which streams of molten glass flow. The quenched glass streams are mechanically pulled from the nozzles by a winding apparatus to form continuous glass filaments.

Regarding the melter portion of this process, a conventional melter is constructed as a large single tank. The environment within the melter is maintained to be relatively calm, especially during a controlled start-up. The melter takes a relatively long time to set-up and then bring to an operating temperature. For operation efficiency, the cycle of each type of glass composition is relatively long. Any undesired or unexpected stoppage in the process can be extremely expensive, as large amounts of glass material may be wasted. Further, an unexpected stoppage can also be dangerous since the process involves extreme heat, molten glass and combustible gases in a confined space.

Various new melter designs have been developed to overcome the negative qualities of a conventional melter. One type of new design is a submerged combustion melter. The heat sources for this type of melter are positioned within and at the bottom of the furnace, that is to say, in a submerged position below the pool of molten glass. In this submerged position, the environment within the melter is much more intense and violent than a conventional melter. The time to bring the melter to an operating temperature is much shorter than a conventional melter. For example, the melt and refine process time associated with a submerged combustion melter may be less than 4 hours.

One advantage of the submerged combustion melter is the ability of the operator to start and stop the melting process as needed. As such, the glass composition can be changed more readily, and the operator can respond to unexpected problems downstream in a much more prompt and inexpensive manner. Starting and stopping the melting process, however, requires a controlled start-up, including a preheating cycle, every time the melter is restarted.

SUMMARY

The general inventive concepts contemplate systems and methods for preheating a glass melter.

In one exemplary embodiment, a submerged combustion melting system may include a submerged combustion melter having a housing with one or more side walls, a floor, and a ceiling, which at least partially define a melt chamber. The system may also include one or more main burners positioned along the floor of the housing and an oxygen/gas burner removably attached to one of the plurality of sidewalls or ceiling, the oxygen/gas burner arranged such that a flame from the oxygen/gas burner is directed downward into the melt chamber.

In one exemplary embodiment, a heat-up burner for a glass melter may include a jacketed body portion having a first side and a second side. The body portion may have a cooling fluid inlet, a cooling fluid outlet, and a purge air passage extending from the second side to the first side. The burner may also include a burner passage extending at an angle relative to the purge air passage, the burner passage including an outer oxygen passage concentric with an inner gas passage, and having a burner passage outlet at the first side.

In one exemplary embodiment, a method of preheating a melt chamber of a glass melter includes attaching an oxygen/gas burner to a burner port located in a ceiling or sidewall of the melter, flowing purge air through the burner and into the melt chamber for a period of time, ceasing the flow of purge air through the burner, flowing oxygen and gas to the oxygen/gas burner, igniting an oxygen and gas mixture at the burner outlet, and directing a flame from the oxygen/gas burner downward into the melt chamber.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which:

FIG. 3 is a side view of an exemplary embodiment of a preheat burner for the submerged combustion melting system of FIG. 1; and FIG. 4 an end view of the preheat burner of FIG. 3.

DETAILED DESCRIPTION

Figure 1:
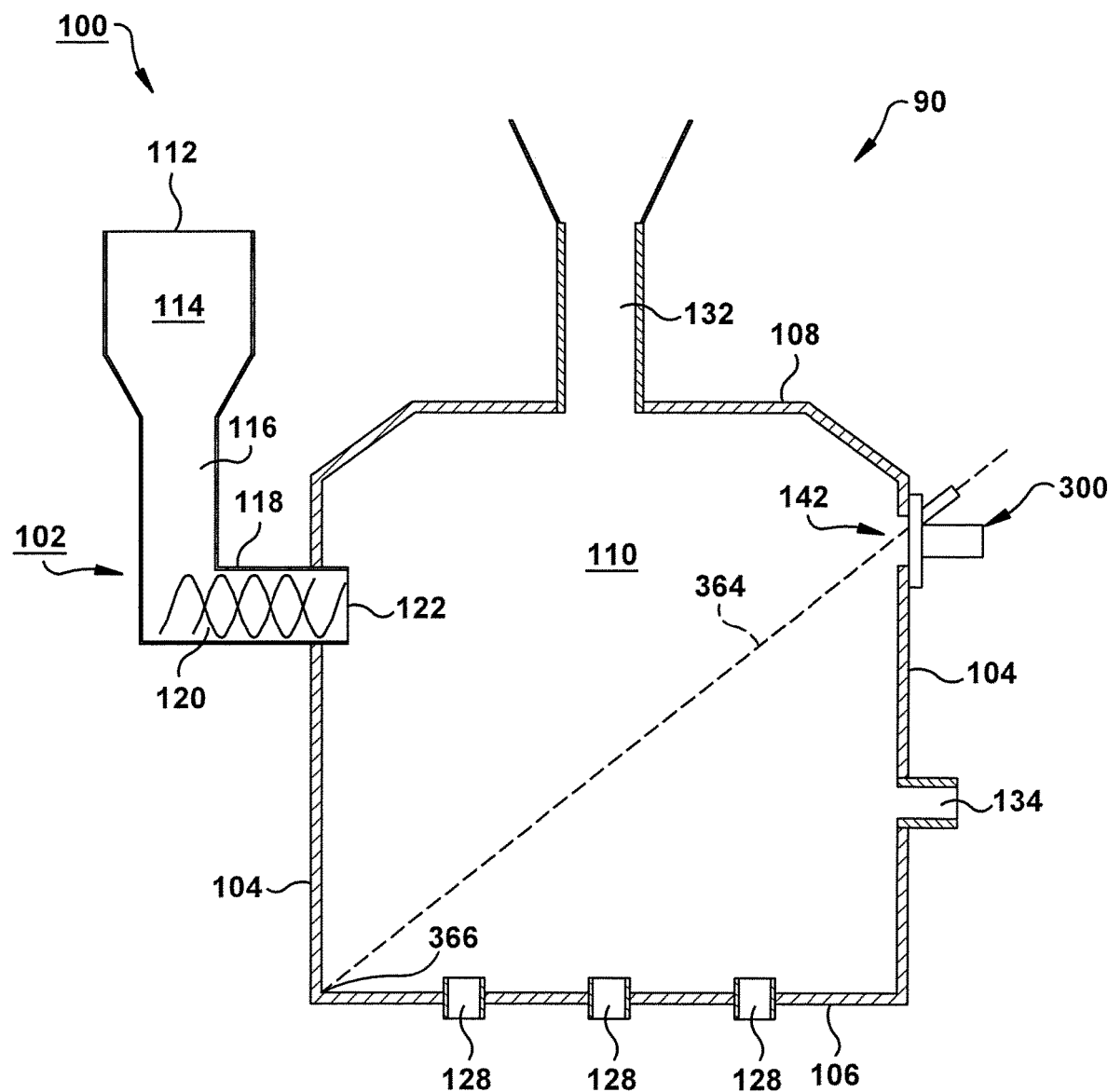
FIG. 1 is a cross-sectional view of an exemplary embodiment of a submerged combustion melting system in an initial start-up state.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

Figure 2:
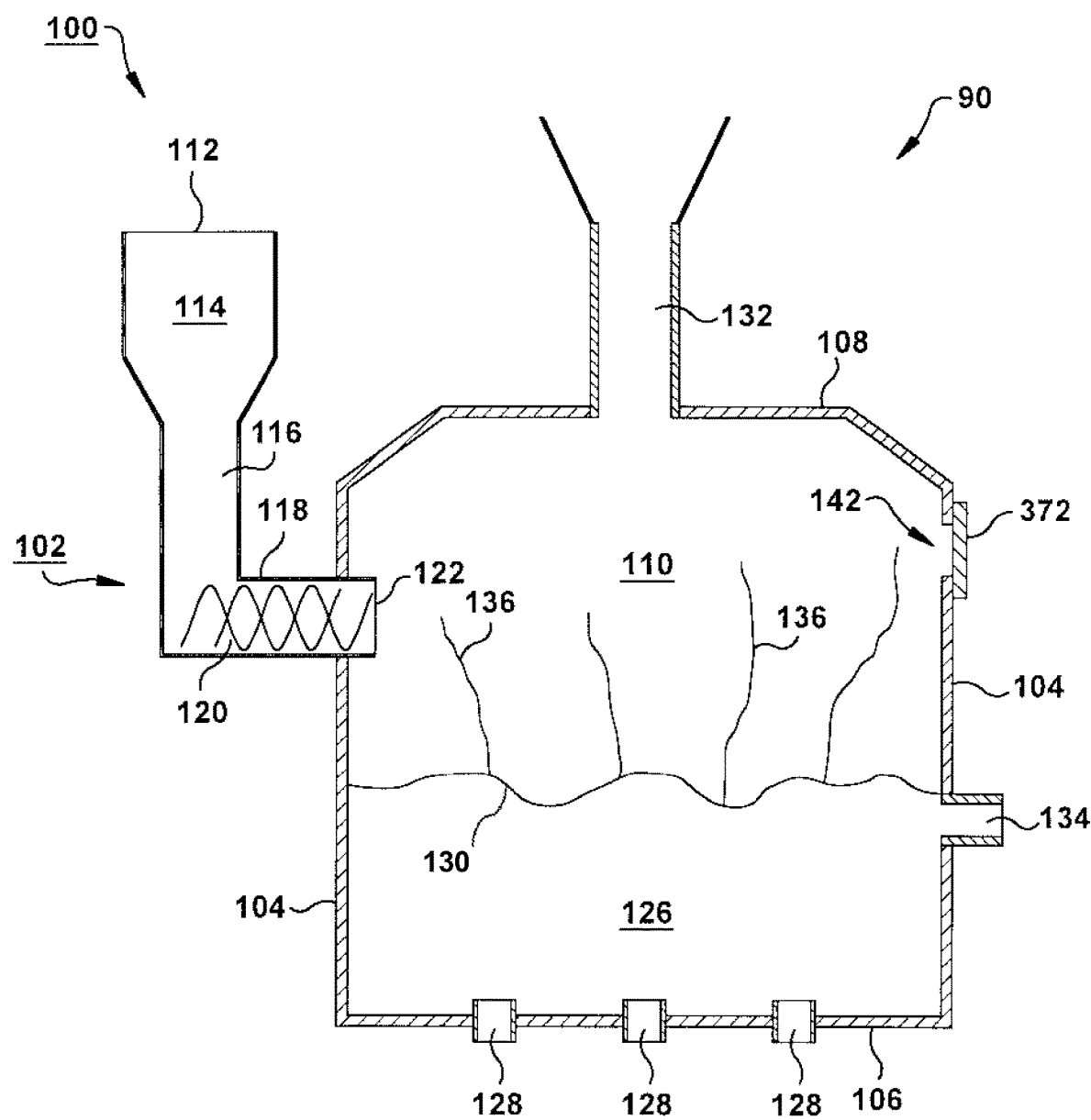
FIG. 2 is a cross-sectional view of the submerged combustion melting system of FIG. 1 in an operational state.

Referring now to the drawings, FIGS. 1 and 2 illustrate an exemplary embodiment of a glass melting system 90. The glass melting system 90 includes a melter 100. The melter 100 may be configured in a variety of ways. In the illustrated exemplary embodiment, the melter 100 is a submerged combustion melter. In other embodiments, however, the melter 100 may be a different style of melter, such as for example, a conventional glass melter as is known in the art.

The melter 100 includes a plurality of side walls 104, a floor 106, and a roof 108 defining a melt chamber 110. Typically, the melter 100 will include at least four side walls 104. In one exemplary embodiment, the melter 100 includes six side walls 104. The side walls 104, the floor 106, and/or the roof 108 may be made of any materials suitable to withstand the environment inside the melter 100. In one exemplary embodiment, the side walls 104, the floor 106, and/or the roof 108 are water-cooled steel walls. In one exemplary embodiment, the side walls 104, the floor 106, and/or the roof 108 include refractory material attached to or otherwise interfaced with an inner surface thereof.

Glass making materials (e.g., raw materials) are delivered to the melt chamber 110 of the melter 100 by a feeding system 102. The exemplary feeding system 102, as shown in FIGS. 1 and 2, includes an inlet opening 112, a bin 114, a chute 116, a screw shaft 118, a screw feeder 120 disposed within the screw shaft 118, and an outlet opening 122. The feeding system 102 is primarily located adjacent and external to the melter 100, with only a portion of the screw shaft 118 extending into the melt chamber 110 (e.g., through one of the side walls 104). In this manner, the outlet opening 122 of the feeding system 102 is disposed within the melter 100 such that the raw materials can be delivered into the melt chamber 110. Thus, the screw shaft 118 functions as a conduit for the raw materials to enter the melter 100.

In operation, the raw materials are first placed in the bin 114 through the inlet opening 112 of the feeding system 102. In one exemplary embodiment, the raw materials are placed in the bin 114 manually. In one exemplary embodiment, the raw materials enter the bin 114 via an automated delivery system (not shown).

As the raw materials enter the bin 114, they travel down the chute 116 (e.g., due to gravity) and collect behind the screw shaft 118. The screw feeder 120 rotates within the screw shaft 118 to pull or otherwise move the raw materials from the chute 116 and through the screw shaft 118. As the raw materials are carried past the screw feeder 120, they exit the screw shaft 118 through the outlet opening 122 and fall down into or otherwise enter the melt chamber 110 where they are processed (i.e., melted).

As shown in FIG. 2, during operation of the melter 100, the raw materials will enter the melt chamber 110 and typically come to rest on a top surface 130 of molten glass 126 within the melter 100. In this manner, the raw materials become mixed in with the molten glass 126 and are melted to increase an amount of the molten glass 126 in the melter 100. The rate at which the amount of the molten glass 126 in the melter 100 is increased can be controlled, at least in part, by varying the rate at which the raw materials are fed to the melt chamber 110 by the feeding system 102.

Furthermore, since operation of the screw feeder 120 removes or otherwise reduces the raw materials that have accumulated in the chute 116 and/or the bin 114 at a measurable or predictable rate, additional raw materials may be added to the feeding system 102 periodically to replenish those being fed into the melt chamber 110. In one exemplary embodiment, additional raw materials are added to the feeding system 102 in accordance with a set schedule. In one exemplary embodiment, additional raw materials are added to the feeding system 102 in accordance with feedback from a control system (not shown). Thus, with a continuous supply of the raw materials available, continuous operation of the melter 100 (i.e., continuous production of the molten glass 126) is possible.

To melt the raw materials carried into the melt chamber 110 by the feeding system 102 and thereby form molten glass 126, the melter 100 uses submerged combustion. Accordingly, a plurality of submerged combustion burners 128 extend through the floor 106 of the melter 100. As used herein, the phrase "submerged combustion burners" refers to burners configured so that the flames generated from the burners, and/or the combustion gases resulting from the flames, develop below and/or within the actual mass of the raw materials being melted. Generally, submerged combustion burners 128 are positioned to be flush with, or project slightly from, the floor 106 of the melter 100. In one exemplary embodiment, the burners 128 are positioned to be flush with, or project slightly from, one or more of the sidewalls 104. In one exemplary embodiment, the burners 128 are positioned to be flush with, or project slightly from, the floor 106 and one or more of the sidewalls 104.

In the submerged combustion burners 128, a mixture of fuel and oxidant, also referred to as a fuel-oxidant mixture, is ignited to initiate combustion and the generated combustion products are introduced directly into a volume of the raw materials being melted. Constant, reliable, and rapid ignition of the fuel-oxidant mixture is provided while a stable flame is maintained beneath the surface 130 of the molten glass 126 such that the mixture burns quickly and releases the heat of combustion directly into the molten glass 126.

Sensors (not shown) or related devices can be used to measure characteristics of the burners 128 during operation. In one exemplary embodiment, a pressure gauge is attached to the fuel line of each burner 128 so that a pressure applied to the burner 128 by the molten glass 126 in which it is submerged can be measured.

The burners 128 are capable of firing gaseous and liquid fuels, alone or in combination, including, but not limited to, natural gas, liquefied low-BTU gas, waste gas, hydrogen, hydrogen-enriched fuel gas, other combustible gases, and fuel oil of various compositions. In one exemplary embodiment, the fuels are gaseous fuels. Examples of suitable oxidants include oxygen, oxygen-enriched air (up to 80% oxygen), air (which contains 21% oxygen), or any gas containing oxygen. The burners 128 can be operated in both fuel-lean and fuel-rich modes, thereby providing either an oxidizing or reducing atmosphere.

The burners 128 heat a batch of glass forming raw materials to melt the raw materials and form the molten glass 126. Gas bubbles released from the burners 128 increase the circulation of the molten glass 126 within the melt chamber 110. In one exemplary embodiment, the burners 128 are oxygen-fuel burners configured to maintain the temperature in the melter 100 within the range of from about 2,200 degrees F. to about 3,000 degrees F. In one exemplary embodiment, the burners 128 are configured to maintain the temperature in the melter 100 within the range of from about 2,650 degrees F. to about 2,800 degrees F. It will be understood that the temperature within the melter 100 will be determined based on the melting temperature of the glass and other material to be melted. Accordingly, the burners 128 may be configured to maintain the temperature in the melter 100 at any desired level, including below about 2,200 degrees F. and above about 3,000 degrees F. Furthermore, other types of burners may be used, such as air-gas burners.

The submerged combustion burners 128 supply energy to the raw materials and other glass constituents being melted in the form of thermal energy (heat release) and mechanical energy (injection of the fuel-oxidant mixture). Simultaneously, well-mixed or homogeneous molten glass 126 is created from the action of the combustion products within the raw materials being melted. The well-mixed or homogeneous molten glass 126 is achieved by injection of high-momentum jets of the combustion products into the molten glass 126, which improves the homogeneity of the molten glass 126 and the quality of the final product. As used herein, "high-momentum" refers to momentum sufficient to overcome the liquid pressure, to create a desired mixing pattern in the melt, and to create forced upward travel of the flame and combustion products.

Submerged combustion provides enhanced mixing, higher shear forces, and more direct heat transfer from the submerged combustion burners 128 to the high-temperature molten glass 126, as compared to conventional melting systems and methods. This results in faster and more complete melting of the raw materials, while minimizing temperature gradients in the molten glass 126. The result is a more efficient process that produces the high temperature molten glass.

Byproducts of the submerged combustion process, including gaseous inclusions escaping the molten glass 126, can leave the melt chamber 110 of the melter 100 via an exhaust duct 132. In one exemplary embodiment, the exhaust duct 132 is formed in the roof 108 of the melter 100. In one exemplary embodiment, if any of the raw materials entering the melt chamber 110 via the feeding system 102 are drawn into the exhaust duct 132, they may be recycled or otherwise reclaimed. For example, a bag room (not shown) may be used to recycle the escaping raw materials.

The melter 100 also includes a molten glass outlet 134. The molten glass outlet 134 is used to carry or otherwise deliver the molten glass 126 out of the melter 100 for further processing. For example, the molten glass 126 produced in the melter 100 can leave the melter 100 via the molten gas outlet 134 and travel downstream to a refining apparatus/station (not shown) and/or a glass production (e.g., fiberization) apparatus/station (not shown). In one exemplary embodiment, the molten glass outlet 134 is formed in one of the sidewalls 104. In one exemplary embodiment, the molten glass outlet 134 is formed in a sidewall 104 of the melter 100 which is opposite and/or non-adjacent a sidewall 104 through which the screw shaft 118 extends.

As noted above, the side walls 104, the floor 106, and/or the roof 108 of the melter 100 are typically cooled, such as by a fluid. Such fluid-cooled walls may increase the operational life of the walls. Furthermore, these cooled walls are known to create a frozen glass layer (not shown) along the inside surfaces of the walls which is beneficial because it minimizes corrosive interaction between the molten glass 126 and the refractory material of the walls. The frozen glass layer is generally formed at least around the volume of the molten glass 126, including on the side walls 104, below the surface 130 of the molten glass 126, and on the floor 106 of the melter 100.

Due to the volatility of the submerged combustion process, a surface of the molten glass 126 is constantly undulating as combustion gases break through the surface. As a result, plumes or portions 136 of the molten glass 126 can rise above the surface 130 of the molten glass 126 within the melt chamber 110, as shown in FIG. 2. Initially, at least some of the plumes or portions 136 of the molten glass 126 will make contact with cooled walls inside the melter 100. As the plumes or portions 136 contact the cooled walls above the surface 130 of the molten glass 126, the molten glass may flow along the cooled walls until it eventually hardens to form more of the frozen glass layer thereon. Once a sufficiently thick frozen glass layer is formed to insulate the walls inside the melter 100, the plumes or portions 136 typically flow or fall back into the pool of the molten glass 126 that rests on the floor 106 of the melter 100.

FIG. 1 illustrates the melter 100 in an initial start-up state in which no glass is within the melting chamber 110. As indicated above, the burners 128 are capable of firing gaseous and liquid fuels, alone or in combination. To ignite the burners 128, the melt chamber 110 may be preheated to a temperature above the auto-ignition temperature of fuel used. For example, in one exemplary embodiment, the burners 128 fire natural gas and the melt chamber 110 may be preheated above the auto-ignition temperature of natural gas (i.e., above approximately 1,076 degrees F.). Once the temperature has reached or exceeded the auto-ignition temperature, the fuel may be introduced to the burners 128 such that the fuel supplied by the burners auto-ignites upon introduction into the melt chamber 110.

To bring the temperature inside the melt chamber 110 above the auto-ignition temperature of the fuel, a pre-heat burner system 300 may be provided. In the illustrated embodiment of FIG. 1, a burner port 142 is provided in a sidewall 104 of the melter 100. In other embodiments, one or more burner port(s) 142 may be provided in multiple side walls 104, the roof 108, or the floor 106. The pre-heat burner system 300 may be configured to mount to, or mount adjacent to, the burner port 142 such that the burner system 300 has access to the melt chamber 110 in order to heat the chamber.

The pre-heat burner system 300 may be configured in a variety of ways. Any configuration suitable for use in a submerged combustion melter and capable of pre-heating the melt chamber 110 above the auto-ignition temperature of the fuel used for the main burners 128 may be used. In the exemplary embodiment, the pre-heat burner system 300 is an oxygen/gas burner. In other embodiments, however, the pre-heat burner system 300 may utilize other fuel-oxidant mixtures.

FIGS. 3 and 4 illustrate an exemplary embodiment of the oxygen/gas pre-heat burner system 300. The burner system 300 can include a jacketed body portion 302 having a first side 304 and a second side 306. The first side 304 is configured to mount over or within the burner port 142 on a sidewall 104 of the melter 100. In the illustrated embodiment, to facilitate attachment to the melter 100, the first side 304 has a substantially planar face 308 to mate with a sidewall 104 of the melter 100 and includes a mounting flange 310 encircling the body portion 302. The mounting flange 310 includes one or more orifices 312 to receive fasteners for attaching the burner system 300 to the melter 100. In other embodiments, however, the burner 300 may include structure other than a planar face and flange for mounting the burner to the melter. Any suitable attachment structure may be used.

The jacketed body portion 302, in the illustrated embodiment, is substantially disk shaped. In other embodiments, however, the jacketed body portion 302 can be any suitable shape. In the exemplary embodiment, the jacketed body portion 302 may define a purge air passage 314 and a burner passage 316. The purge air passage 314 extends from a purge air inlet 318 on the second side 306 to a purge air outlet 320 on the first side 304. The purge air passage 314 has a cross-sectional flow area AP. Attached to purge air inlet 318 is a purge air supply conduit 322 to supply purge air to the melter. The purge air supply conduit 322 is fluidly connected to a supply of compressed air (not shown). The purge air supply conduit 322 can be any suitable conduit, such as for example a pipe or hose and at least a portion of the conduit 322 can be integrally formed with the body portion 302.

The burner passage 316 may be configured in a variety of ways. In the illustrated embodiment, the burner passage 316 is configured as a passage-in-passage design. In particular, the burner passage 316 includes an inner gas passage 324 and an outer oxygen passage 326 concentric with, or generally concentric with, the inner gas passage 324. As a result of the passage-in-passage design, there is no premixing of oxygen and gas in the burner passage 316. The oxygen and the gas mix upon exiting the burner passage 316. The inner gas passage 324 extends from a gas inlet 328 to a gas outlet 330 on the first side 304. Attached to the gas inlet 328 is a gas supply conduit 332 to supply gas to the burner system 300. The gas supply conduit 332 is fluidly connected to a supply of gaseous fuel (not shown), such as for example, natural gas. The gas supply conduit 332 can be any suitable conduit, such as for example a pipe or hose, and at least a portion of the gas supply conduit 332 can be integrally formed with the burner passage 316.

The outer oxygen passage 326 extends from an oxygen inlet 338 to an oxygen outlet 340 on the first side 304. The outer oxygen passage 326 having cross-sectional flow area AO. As shown in FIG. 4, the cross-sectional flow area AP of the purge air passage 314 is larger than the cross-sectional flow area AO of the outer oxygen passage 326. Attached to the oxygen inlet 338 is an oxygen supply conduit 342 to supply oxygen the burner system 300. The oxygen supply conduit 342 is fluidly connected to a supply of oxygen fuel (not shown). The oxygen supply conduit 342 can be any suitable conduit, such as for example a pipe or hose, and at least a portion of the oxygen supply conduit 342 can be integrally formed with the burner passage 316.

The burner system 300 can also include an igniter 344. The igniter 344 can be configured in a variety of ways. Any ignition device capable of igniting gaseous fuel at or near the gas outlet 330 may be used. In the illustrated embodiment, the igniter 344 is a spark plug including a terminal 346 to connect the spark plug to an ignition system (not shown), an elongated body 348 extending along the burner passage 316 within the inner gas passage 324, and a tip 350 at or near the first side 304. The tip 350 includes a central electrode 352 and the igniter 344 is configured to generate a high voltage sparked between the central electrode 352 and a wall 354 of the gas passage 324 to provide the ignition source for the burner system 300.

The jacketed body portion 302 surrounds the purge air passage 314 and the burner passage 316 at the first side 304 with a cooling fluid passage. The jacketed body portion 302 includes a cooling fluid inlet 356 fluidly coupled to a cooling fluid outlet 358 by the cooling fluid passage. The cooling fluid inlet 356 is fluidly connected to a supply of cooling fluid (not shown), such as for example, water or coolant, by a cooling fluid inlet conduit 360 and the cooling fluid outlet 358 is fluidly connected to a cooling fluid outlet conduit 362. The cooling fluid conduits 360, 362, can be any suitable conduit, such as for example a pipe or hose, and at least a portion of the cooling fluid conduits 360, 362, can be integrally formed with the jacketed body portion 302.

The burner passage 316 can be arranged at an angle α relative to the air purge passage 314. In one embodiment, the air purge passage is 314 extends perpendicular, or generally perpendicular, to the planar face 308 and the burner passage 316 is angled downward such that once the burner is mounted to a sidewall 104 of the melter, the burner passage 316, and any flame the passage generates, will be directed downward toward the floor 106, the burners 128, or a lower portion of an opposing side wall 104, as shown by the dashed line 364 in FIG. 1. Any angle that directs the flame downward toward the floor 106, the burners 128, and/or a lower portion of an opposing side wall 104 may be used. For example, in one embodiment, the angle α in the range of approximately 20 degrees to approximately 60 degrees, or in the range of approximately 30 degrees to approximately 50 degrees, or in the range of approximately 35 degrees to 45 degrees, or approximately 40 degrees. In one exemplary embodiment, the angle α is selected such that the burner passage 316 is aimed toward the intersection 366 (FIG. 1) between the floor 106 and an opposing sidewall 104.

The burner 300 may also include a flame detector 368. The flame detector 368 can be configured in a variety of ways. Any detecting device that can provide an indication that a flame is present at the gas outlet 330 of the burner passage 316 may be used. In the illustrated embodiment, the flame detector 368 is an ultraviolet (UV) detector. In other embodiments, however, the flame detector 368 can utilize any suitable flame detecting method, such as for example, near infrared (IR), infrared (IR), ultraviolet/infrared (UV/IR), dual infrared (IR/IR), triple IR (IR3), ionization current, or other suitable flame detection method. In the illustrated embodiment, the flame detector 368 is positioned at or near the gas outlet 330. The flame detector 368, may be configured to provide a feedback signal to a safety circuit that can activate a visible/audible alarm and shut off the gas and oxygen supply to the burner.

The burner system 300 may also include an air flow sensor 370 arranged to measure air flow in the purge air supply conduit 322 or purge air passage 314. The air flow sensor 370 can be any suitable air flow sensor and may be configured to provide a feedback signal to a safety circuit that can activate a visible/audible alarm and shut off the gas and oxygen supply to the burner.

Referring to FIG. 1, to begin the heat-up process, and subsequent ignition, of the melter 100, the burner system 300 can be attached to the melter at the burner port 142. The purge air supply conduit 322, the gas supply conduit 332, the oxygen supply conduit 342, the cooling fluid inlet conduit 360, and the cooling fluid outlet conduit 362 can also be connected to the burner system 300. In addition, the igniter 344 can be connected to an ignition system (not shown) and the flame detector 368 and air flow sensor 370 can be installed and appropriately connected, such as to a safety circuit. To preheat the melter 100, the burner system 300 can flow purge air into the melt chamber 110 for a period of time to ensure that no combustible gases are built up in the chamber prior to igniting the burner system 300. In one exemplary embodiment, the burner system 300 flows purge air into the melt chamber 110 for at least 2 minutes. For example, in one embodiment, the burner system 300 flows purge air into the melt chamber 110 for approximately 3 minutes. The air flow sensor 370 can verify that purge air is flowing through the burner system 300 and provide a signal or disable the burner system 300 if the sensor does not detect air flow.

Once the melt chamber 110 has been sufficiently purged, the purge air flow may cease and oxygen and gas flow through the burner passage 316 can be started. The igniter 344 can then be activated resulting in a high voltage spark that ignites the oxygen/gas mixture of the burner system 300. Cooling fluid flow through the jacketed body portion 302 may be turned on prior to or after ignition. The jacketed body portion 302 reduces surface temperature of the burner system 300 for operator safety. Once ignited, the oxygen and gas flow can be ramped up to increase the heat and flame size to heat up the melt chamber 100. As indicated earlier, the angle α of the burner passage 316 allows for the burner flame to be directed downward into the melt chamber 110, where the main burners 128 are located, to prioritize heating up the area where auto-ignition will occur.

Once the melt chamber 110 has reached sufficient temperature for auto-ignition of the fuel used for the main burners 128, the fuel to the main burners may be turned on resulting in auto-ignition of the main burners 128. In conventional glass melters, the melt chamber is typically pre-heated using excess air/gas burners. The exemplary embodiment of the oxygen/gas pre-heat burner system 300, however, produces significantly less exhaust gas during operation than excess air/gas burners. In some exemplary embodiments, the burner 300 produces about 80% less exhaust gas than a conventional excess air/gas burner. As a result, the velocity of exhaust gases in the melt chamber 110 is reduced when using the exemplary oxygen/gas pre-heat burner system 300, which reduces the potential that the exhaust gas flow will extinguish the flame of the main burners (flame out) during, or shortly after, initial auto-ignition.

After auto-ignition, the heat-up burner system 300 can be shut down and disconnected from the melter 100. The jacketed body portion 302 cools the exterior surface of the burner system 300 to allow safe handling during disconnection. A cover plate 372 (FIG. 2) or other suitable structure can be attached over the burner port 142 during operation of the melter 100 after the pre-heat burner system 300 has been removed.

The above description of specific embodiments has been given by way of example. From the disclosure given, those skilled in the art will not only understand the general inventive concepts and their attendant advantages, but will also find apparent various changes and modifications to the structures and concepts disclosed. For example, although the illustrated embodiments described herein utilize, as an example, an oxygen/gas burner for a submerged combustion melter, the general inventive concepts are applicable to other types of burners and glass melters. Furthermore, though the illustrated pre-heat burner is described as having a passage-in-passage design, a purge air passage, and a jacketed body, other burner designs may be used. It is sought, therefore, to cover all such changes and modifications as fall within the spirit and scope of the general inventive concepts, as defined herein and by the appended claims, and equivalents thereof.

We claim:

1. A submerged combustion melting system comprising:
a submerged combustion melter including:
a housing having one or more side walls, a floor, and a ceiling which at least partially define a melt chamber; and
one or more main burners positioned along the floor of the housing; and
a preheat burner system removably attached to one or more sidewalls or the ceiling, wherein the preheat burner system is an oxygen/gas burner system including a purge air passage capable of directing purge air into the melt chamber, a gas passage, and an oxygen passage separate from the purge air passage, and wherein the preheat burner system is arranged such that a flame from the preheat burner system is directed downward into the melt chamber.

2. The submerged combustion melting system of claim 1, wherein the preheat burner system is arranged such that the flame is directed generally at the intersection between the floor and a side wall.

3. The submerged combustion melting system of claim 1, wherein the oxygen passage is concentric with the gas passage.

4. The submerged combustion melting system of claim 1, wherein the oxygen passage is adjacent to the gas passage.

5. The submerged combustion melting system of claim 1, wherein the preheat burner system includes an igniter disposed within the gas passage.

6. The submerged combustion melting system of claim 1, wherein the preheat burner system further includes a flame detector.

7. The submerged combustion melting system of claim 1, wherein the preheat burner system further includes a purge air flow sensor.

8. The submerged combustion melting system of claim 1 wherein the purge air passage has a first cross-sectional flow area and the oxygen passage has a second cross-sectional flow area that is less than the first cross-sectional flow area.

9. A submerged combustion melting system comprising:
a submerged combustion melter including:
a housing having one or more side walls, a floor, and a ceiling which at least partially define a melt chamber;
one or more main burners positioned along the floor of the housing; and
a preheat burner system removably attached to one or more sidewalls or the ceiling, the preheat burner system arranged such that a flame from the preheat burner system is directed downward into the melt chamber,
wherein the preheat burner system comprises:
a jacketed body portion having a first side and a second side, the body portion having a cooling fluid inlet, a cooling fluid outlet, and a purge air passage extending from the second side to the first side; and
a burner passage extending at an angle relative to the purge air passage and having a burner passage outlet at the first side, the burner passage including an outer oxygen passage concentric with an inner gas passage.

10. The submerged combustion melting system of claim 9, wherein the preheat burner system further includes an igniter disposed within the gas passage.

11. The submerged combustion melting system of claim 9, further comprising a flame detector positioned to detect the presence of a flame at the burner passage outlet.

12. The submerged combustion melting system of claim 11, wherein the flame detector extends into the purge air passage.

13. The submerged combustion melting system of claim 9 wherein the purge air passage has a first cross-sectional flow area and the outer oxygen passage has a second cross-sectional flow area that is less than the first cross-sectional flow area.

14. A method of preheating a melt chamber of a submerged combustion glass melter, the method comprising:

attaching an oxygen/gas burner system to a burner port located in a ceiling or sidewall of the submerged combustion melter;
flowing purge air through the oxygen/gas burner system and into the melt chamber for a period of time;
ceasing the flow of purge air through the oxygen/gas burner system;
flowing oxygen and gas to the oxygen/gas burner system;
igniting an oxygen and gas mixture at a burner outlet; and
directing a flame from the oxygen/gas burner system downward into the melt chamber.

15. The method of claim 14 further comprising detecting the flow of purge air through the oxygen/gas burner system and providing a signal if insufficient purge air is detected.

16. The method of claim 14 further comprising detecting the flame from the oxygen/gas burner system and shutting off the flow of gas to the oxygen/gas burner system if the flame is not detected.

17. The method of claim 14 further comprising flowing cooling fluid through a body of the oxygen/gas burner system.

18. The method of claim 14, wherein the submerged combustion glass melter includes one or more main burners fueled by a gaseous fuel, and wherein the method further comprises continuing to direct the flame into the melt chamber until auto-ignition conditions for the gaseous fuel are reached within the melt chamber.

19. The method of claim 18 further comprising flowing the gaseous fuel to the one or more main burners to ignite the main burners.

20. The method of claim 19 further comprising turning off and detaching the oxygen/gas burner system from the burner port and covering the burner port with a cover plate after ignition of the main burners.

* * * * *